(12) United States Patent
Isenburg et al.

(10) Patent No.: US 8,556,300 B2
(45) Date of Patent: Oct. 15, 2013

(54) PREASSEMBLED MEDIA LINE

(75) Inventors: Marco Isenburg, Ratingen (DE); Frank Peters, Lindlar (DE); Michele Stelluto, Remscheid (DE); Josef Brandt, Wipperfürth (DE); Sascha Rosenfeldt, Dortmund (DE); Adrian Klehr, Balve (DE)

(73) Assignee: VOSS Automotive GmbH, Wipperfürth (DE)

( * ) Notice: Subject to any disclaimer, the term of this patent is extended or adjusted under 35 U.S.C. 154(b) by 513 days.

(21) Appl. No.: 12/670,568

(22) PCT Filed: Jul. 24, 2008

(86) PCT No.: PCT/EP2008/059735
§ 371 (c)(1),
(2), (4) Date: May 20, 2010

(87) PCT Pub. No.: WO2009/013342
PCT Pub. Date: Jan. 29, 2009

(65) Prior Publication Data
US 2010/0253067 A1    Oct. 7, 2010

(30) Foreign Application Priority Data

Jul. 26, 2007  (DE) .......................... 20 2007 010 502

(51) Int. Cl.
*F16L 53/00* (2006.01)
(52) U.S. Cl.
USPC ................ 285/41; 285/119; 285/242; 174/59
(58) Field of Classification Search
USPC ........ 138/33, 35; 285/41, 119, 239, 242, 245; 392/468; 439/193; 174/59
See application file for complete search history.

(56) References Cited

U.S. PATENT DOCUMENTS

| 2,793,280 | A | * | 5/1957 | Harvey ......................... 137/341 |
| 3,378,673 | A | * | 4/1968 | Hopper ......................... 392/472 |
| 4,455,474 | A | * | 6/1984 | Jameson et al. ............... 392/472 |
| 4,778,447 | A | * | 10/1988 | Velde et al. .................... 604/29 |

(Continued)

FOREIGN PATENT DOCUMENTS

| CA | 2008633 A1 | 7/1990 |
| DE | 19818649 | 10/1999 |

(Continued)

OTHER PUBLICATIONS

International Search Report of PCT/EP2008/059735.

*Primary Examiner* — James Hewitt
*Assistant Examiner* — Jay R Ripley
(74) *Attorney, Agent, or Firm* — Brinks Hofer Gilson & Lione

(57) ABSTRACT

The present invention relates to a preassembled media line with a line connector, composed of a connector body with a connecting portion to which a media line is connected, and with a coupling portion for sealed connection to a mating coupling part. In this arrangement, the media line is provided with a heating wire and said heating wire is continued from the connector body and the media line, when connected, in such a manner that it is arranged at least partially on the coupling portion. The connector body and the media line are surrounded at the end by a housing formed, in particular, from housing shells, the sealing function and a retaining function being divided between the housing and the connector body.

17 Claims, 8 Drawing Sheets

(56) References Cited

U.S. PATENT DOCUMENTS

| | | | |
|---|---|---|---|
| 6,554,322 B2 * | 4/2003 | Duong et al. | 285/305 |
| 7,159,905 B1 * | 1/2007 | Stark et al. | 285/41 |
| 2006/0087118 A1 * | 4/2006 | Andre et al. | 285/328 |
| 2007/0176418 A1 * | 8/2007 | Frogneborn et al. | 285/242 |
| 2008/0271801 A1 * | 11/2008 | Sonderegger et al. | 138/33 |

FOREIGN PATENT DOCUMENTS

| | | |
|---|---|---|
| DE | 20 2006 003590 | 6/2006 |
| EP | 0 379 635 A | 8/1990 |
| EP | 1698769 A2 | 9/2006 |
| WO | WO 2005/124219 A | 12/2005 |
| WO | WO 2005124219 A1 * | 12/2005 |

* cited by examiner

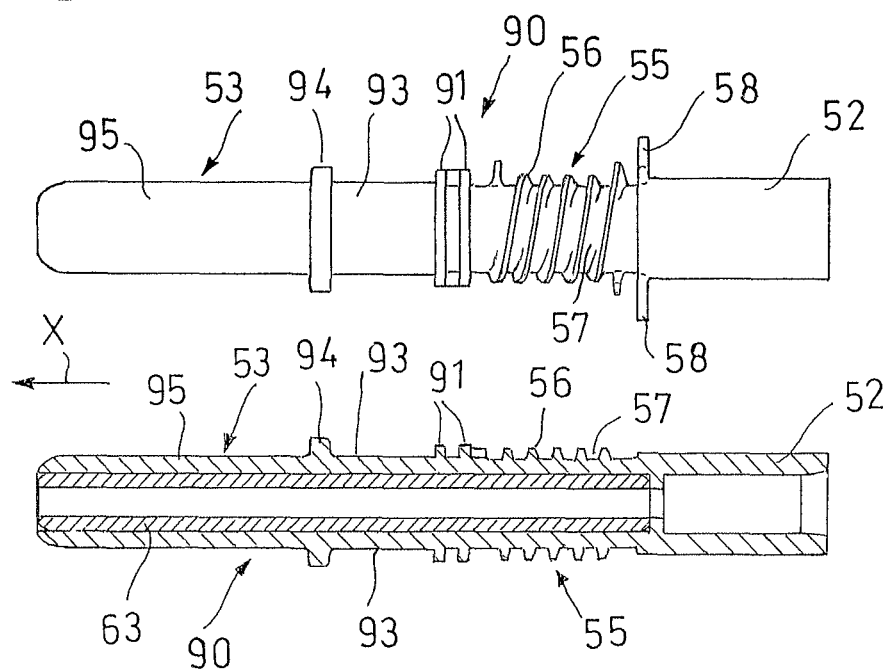

PREASSEMBLED MEDIA LINE

CROSS REFERENCE TO RELATED APPLICATIONS

This application claims the benefit of priority to PCT/EP2008/059735 filed Jul. 24, 2008, and DE 20 2007 010 502.9 filed Jul. 26, 2007, the entire contents of which are each hereby incorporated herein by reference.

FIELD OF INVENTION

The present invention relates to a preassembled media line with a line connector, composed of a connector body with a connecting portion to which a media line is connected, and with a coupling portion for sealed connection to a mating coupling part.

The present invention furthermore relates to a line connector for use in a preassembled line and to a housing for the purpose of accommodating a line connector of this kind.

BACKGROUND

In vehicles, there is an ever increasing need to convey fluids to different points that freeze even at relatively low temperatures, urea/water solutions freezing at −11° C., for example. It is therefore a known practice to heat the media lines required for this purpose. Since vehicles are becoming more and more compact in construction, the heatable fluid-carrying lines must also be fitted at points in the vehicle that are exposed to very high temperatures, e.g. 160° C. and above, during the operation of the vehicle. However, it is also important to ensure that the media line is heated as completely as possible, i.e. that both the media line and the connector are heated.

It is then the underlying object of the present invention to provide a preassembled media line which, on the one hand, allows virtually continuous heating and, on the other hand, ensures good thermal insulation against the effect of heat from outside, especially in the critical region of the connection between the media line and the connector.

According to the invention, the object set is achieved by virtue of the fact that the media line is provided with a heating wire and said heating wire is continued from the connector body and the media line, when connected, in such a manner that it is arranged at least partially on the coupling portion, and the connector body and the media line are enclosed at the end by a housing formed, in particular, from housing shells, the sealing function and a retaining function being divided between the housing and the connector body in the region of the coupling portion. In this arrangement, it is advantageous, in particular, if the coupling portion has the sealing means for sealing relative to the mating coupling part, and the housing has latching means for latching connection therewith. In this arrangement, it is advantageous, in particular, if the housing has the latching means for latching with the mating coupling part on its housing portion surrounding the coupling portion. By virtue of the division according to the invention of the sealing function and the retaining function between the connector body and the housing, the heating wire can be taken into the region of the latching means formed on the housing, thereby allowing extensive heating of the connector. The housing, which surrounds the connecting body, on the one hand, and the end of the media line, on the other hand, and is preferably composed of a thermally insulating material, ensures thermal protection for the point of connection between the media line and the line connector. Since the housing according to the invention is produced from housing half-shells, preferably two housing half-shells, the housing can be retrofitted around the connector body with the media line connected and after the heating wire has been passed through and fixed on the circumference of the coupling portion, the housing according to the invention simultaneously allowing a retaining function for the line connector and fixing of the media line. Moreover, it serves as thermal protection against external heat radiation. At the same time, the housing according to the invention also serves as a shield against the heat produced by the heating wire, thus preventing it from escaping to the outside. As regards its material properties, the connector piece according to the invention can be matched to the fluid to be conveyed in order to achieve the maximum possible thermal conductivity and resistance to chemical attack. For example, the connector body can be composed of stainless steel if the line is used to convey urea solutions. Furthermore, the two-piece construction of the line connector from an inner connector body and an outer housing makes it possible to dimension these two parts in such a way that there is an inner circumferential air gap between the two parts, thus allowing air gap insulation to be achieved. Separating the connector body and the housing likewise makes it possible to match the length of the housing in the region of the connecting portion of the media line to the particular requirements, thus enabling it to be extended as far as necessary over the media line to protect said line and to protect the connection point of the media line.

Uniform heat distribution over the entire coupling portion of the line connector can be achieved in the present invention if a heat-conducting element which conducts the heat from the heated region into the remaining region of the coupling portion is arranged on the coupling portion in a region which is not heated directly by the heating wire.

BRIEF DESCRIPTION OF THE DRAWINGS

The invention is explained in greater detail with reference to the illustrative embodiments shown in the attached drawings, in which:

FIG. 12 shows an elevation of a further embodiment of a connector body according to the invention, and FIG. 13 shows a longitudinal section through the connector body in FIG. 12.

DETAILED DESCRIPTION

Figure 1:
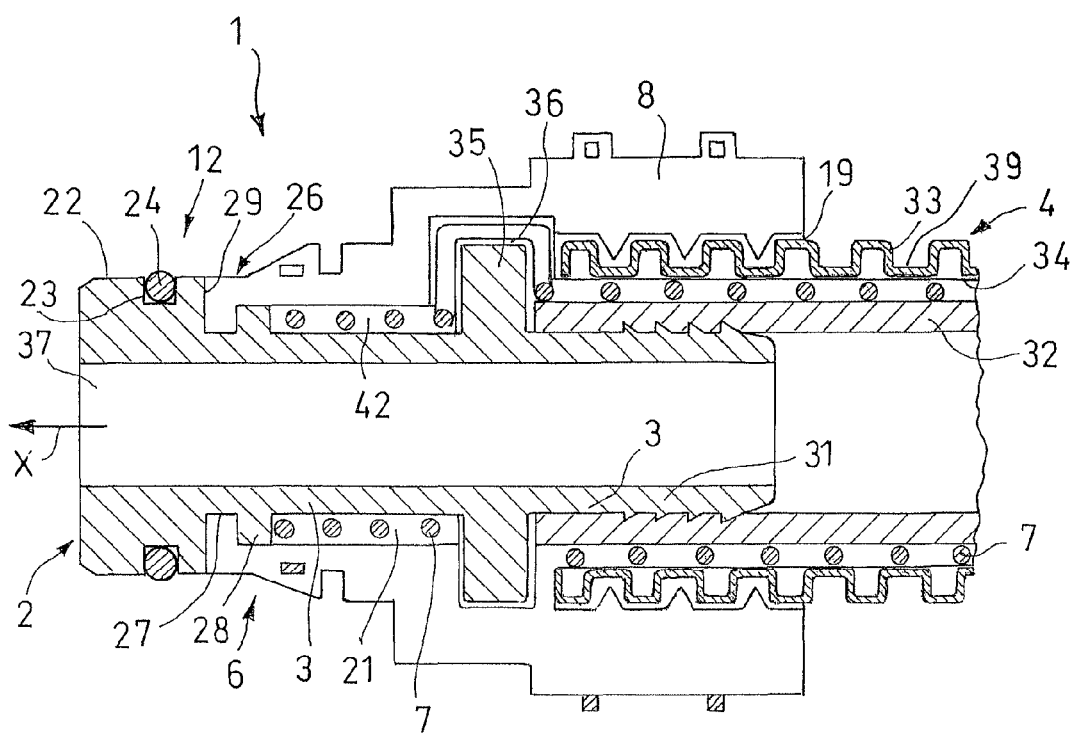
FIG. 1 shows a longitudinal section through a preassembled line according to the invention.

As can be seen from FIG. 1, a preassembled line according to the invention is composed of a line connector 1, to which a connector body 2 with a connecting portion 3, to which a media line 4 is connected, and with a coupling portion 6 for sealed, and preferably releasable, connection to a mating coupling part. This mating coupling part is not shown since it is a conventional mating coupling part which, in particular, enables releasable plug-in connection with the coupling portion 6.

The media line 4 is provided with a heating wire 7, and said heating wire 7 is continued from the connector body 2 and the media line 4, when connected, in such a manner that it is arranged at least partially on the coupling portion 6. According to the invention, the sealing function in the case of the line connector 1 is divided between said connector and the mating coupling part, and its retaining function in relation to the mating coupling part is divided between the connector body 2 and a housing 8 surrounding the connector body 2 and the media line 4 at the end. The housing 8 is preferably formed from two housing half-shells 9, which are connected positively and/or nonpositively, in particular by a latching connection. For this purpose, complementary latching means 11 are formed on the outer circumference in the region of the connection of the two housing half-shells 9. The housing half-shells 9 can also be adhesively bonded or welded. The coupling portion 6 advantageously has the sealing means 12 that serve to provide sealing relative to the mating coupling part, and the housing 8 has the latching means 13 for latching connection to the mating coupling part.

Figure 2:
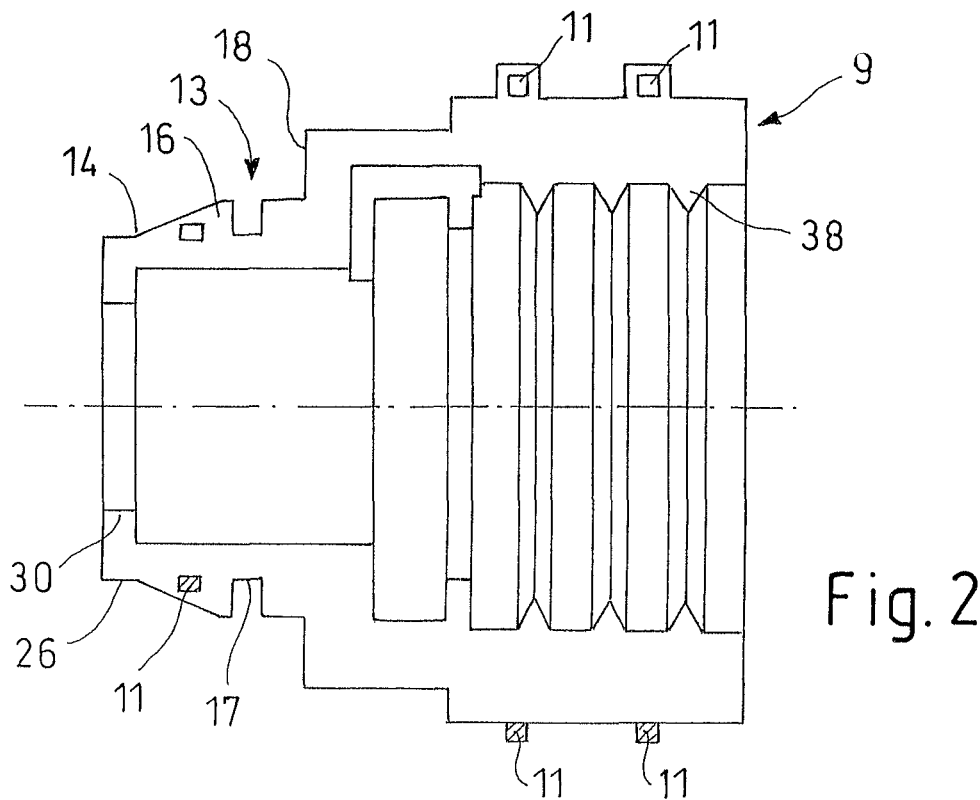
FIG. 2 shows a longitudinal section through a half-shell of a housing according to the invention.

As shown in FIGS. 1 and 2, the latching means 13 are formed on a housing portion 14 surrounding the coupling portion 6. In this arrangement, the latching means 13, in particular, are composed of a latching cam 16, which is formed on the circumference of the housing, which extends circumferentially and behind which, as seen in the direction of insertion X, a latching groove 17 is formed. A latching means formed in the mating coupling part, said latching means being resiliently mounted for example, can then engage in this latching groove 17 in the inserted condition of the coupling portion 6. The housing 8 according to the invention furthermore has an outer stop 18 situated ahead of the circumferential latching groove 17 as seen in the direction of insertion X. This stop 18 limits the insertion travel of the coupling portion 6 into the mating coupling part.

As can be seen, in particular, from FIG. 1, a circumferential gap portion 19 for the purpose of accommodating the media line 4 is formed between the housing 8 and the connector body 2 in the region of the connecting portion 3. In the region of the latching means 13, between the housing 8 and the connecting portion 3, there is a circumferential gap region 21, in which the heating wire 7 extends, the heating wire 7 being arranged, in particular, in the form of a spiral winding surrounding the coupling portion 6. According to the invention, the heating wire 7 is thus continued from the media line 4 into the coupling portion region, where it surrounds the coupling portion 6 with a heating winding 42. This enables the heating of the line preassembled in accordance with the invention to begin in the mating coupling part, thus allowing virtually continuous, uninterrupted heating of the preassembled line according to the invention. The connector body 2 according to the invention is dimensioned in such a way that the coupling portion 6 projects from the housing 8 with a plug-in and sealing portion 22 of circular-cylindrical cross section. The plug-in and sealing portion 22 has on its circumferential surface a circumferential groove 23 with a circumferential seal 24, in particular an O ring seal, arranged therein. The circumferential groove 23 and the circumferential seal 24 form the sealing means 12. However, it is likewise within the scope of the invention to provide different options for the seal between the connector body 2 and the mating coupling part. The outside diameter of the plug-in and sealing portion 22 and an introduction portion 26 of the housing 8, said introduction portion adjoining said plug-in and sealing portion and being of circular-cylindrical cross section, have the same outside diameter. As can be seen, in particular, from FIG. 2, the latching means 13 are formed on the rear end of the introduction portion 26 as seen in the direction of insertion X.

According to the invention, provision is now furthermore made that, following on from the plug-in and sealing portion 22 as seen in the direction of insertion, there is a body portion 27 of reduced diameter relative to the outside diameter of said plug-in and sealing portion 22. An annular collar 28 is formed integrally on the circumferential surface of this body portion 27, with the result that a groove 29 for the purpose of accommodating a retaining extension 30 formed integrally on the inside of the housing 8, at its front end as seen in the direction of insertion, is formed between said collar and the plug-in and sealing portion 22. This construction ensures that the housing 8 is held positively to the connector body 2 in the installed condition of the housing 8.

FIG. 1 shows that a plug-in spigot 31 for nonpositive and/or positive connection of the media line 4 is formed integrally at that end of the connector body 2 which is remote from the plug-in and sealing portion 22. The media line 4 is composed of an inner line tube 32, on the circumference of which the heating wire 7 is arranged, in particular wound in a spiral, and of an outer protective tube 33, which is designed, in particular, as a corrugated tube. The heating wire 7 is fixed on the line tube 32 by means of an adhesive tape 34 surrounding said wire. The plug-in spigot 31 is thus connected to the line tube 32 by being pressed into the line tube 32, with the result that a positive and nonpositive connection is achieved. The line tube 32 is preferably a PA tube. There is advantageously an encircling stop 35 for the media line 4 on the connector body 2 between the body portion 27 of reduced diameter and the plug-in spigot 31. The outside diameter of the stop 35 can be matched substantially to the outside diameter of the media line 4, there being a gap 36 for the purpose of passing through the heating wire 7 between the outer circumference of the stop 35 and an opposite inner wall of the housing 8. The connector body 2 has a through bore 37, through which a medium to be conveyed is passed from the media line 4 to the mating coupling part. The housing 8 is advantageously composed of a plastic with good thermal insulation properties, in particular a glass-reinforced PPA (polyphtalamide). The housing 8 and the connector body 2 can advantageously be dimensioned in such a way relative to one another that an air gap is formed between these in the region in which the heating wire 7 is wound onto the coupling portion 6 and in the region of the transition to the connecting portion 3, thus improving the thermal insulation properties. In the region of the circumferential gap portion 19, on its inner wall, the housing 8 has circumferential ribs 38 which engage in corrugation troughs 39 of the protective tube 33, which is designed as a corrugated tube 33. The media line 4 is thereby fixed within the housing 8.

Figure 3:
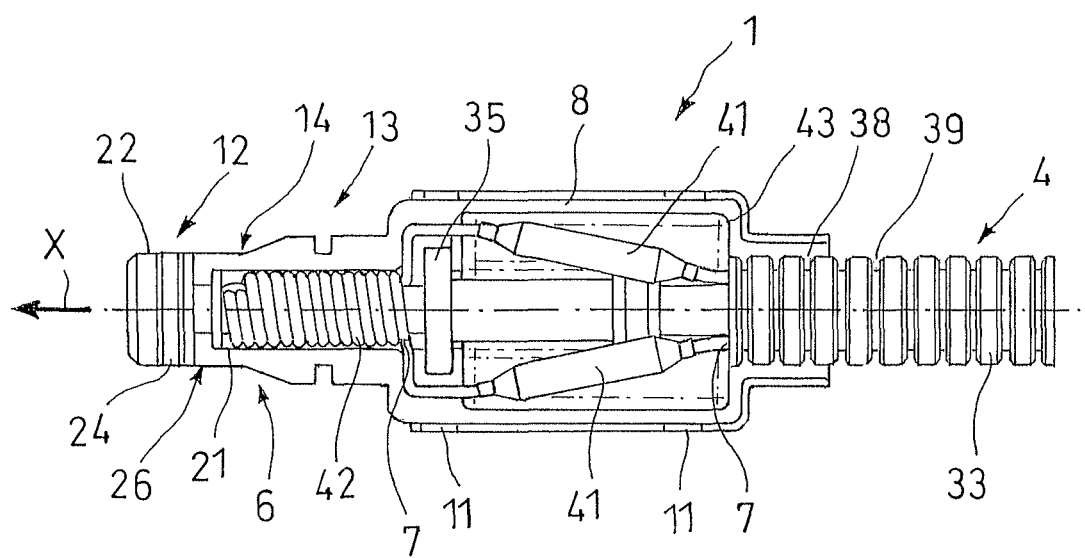
FIG. 3 shows a side view of a further embodiment of a preassembled line according to the invention in partial section.
Figure 4:
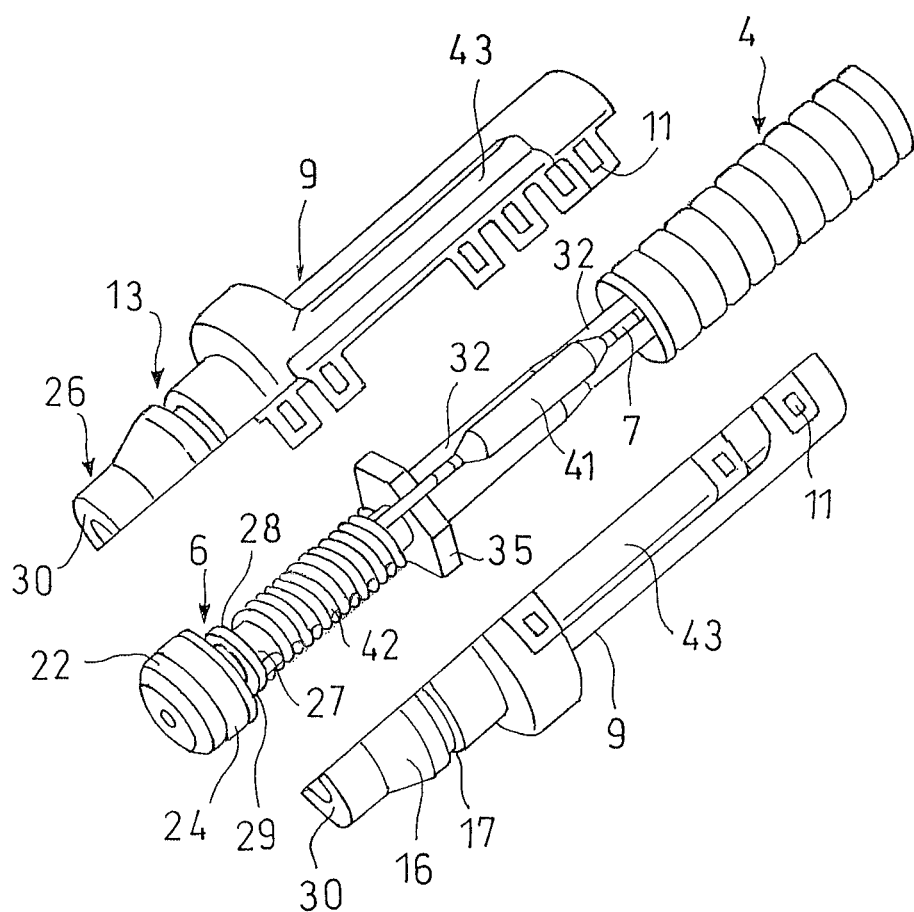
FIG. 4 shows an exploded view of the line in FIG. 3.

FIGS. 3 and 4 show a further embodiment of the preassembled line according to the invention. Here, parts identical to those in FIGS. 1 and 2 are denoted by the same references.

As a departure from the embodiment in FIG. 1, FIG. 3 shows the heating wire 7 coming from the media line 4 being connected to the heating winding 42 arranged around the coupling portion 6 by means of a conventional crimped connection 41. To accommodate the crimped connection 41, the housing 8 is provided with lateral protrusions 43 to enlarge the interior. The stop 35 is used as a stop for the inner line tube 32, and the protective tube 33 is not taken as far as the stop 35 to ensure that the interior remains free for the crimped connection 41. The stop 35 has a polygonal circumferential contour, in particular a hexagonal circumferential contour, thus serving as an anti-rotation safeguard.

It is likewise within the scope of the invention if, as a modification of the illustrative embodiments described, if an electrical power supply lead is introduced into the interior of the housing 8 from outside and connected to the heating wire 7 and the heating winding 42. The interior of the housing 8 can furthermore be filled with an insulating potting compound. The connector body 2 can also be designed in such a way at one end that it can be connected materially to the line tube 32, e.g. by welding or adhesive bonding. In this case, the parts to be connected are then preferably composed of the same materials. Instead of the heating wire 7 being fixed on the line tube 32 by means of an adhesive tape, the heating wire 7 can also be embedded in a plastics layer of the line tube 32.

In all the illustrative embodiments shown, the housing 8 has both a protective function and a retaining function for the connector body 2 and the media line 4.

Figure 5:
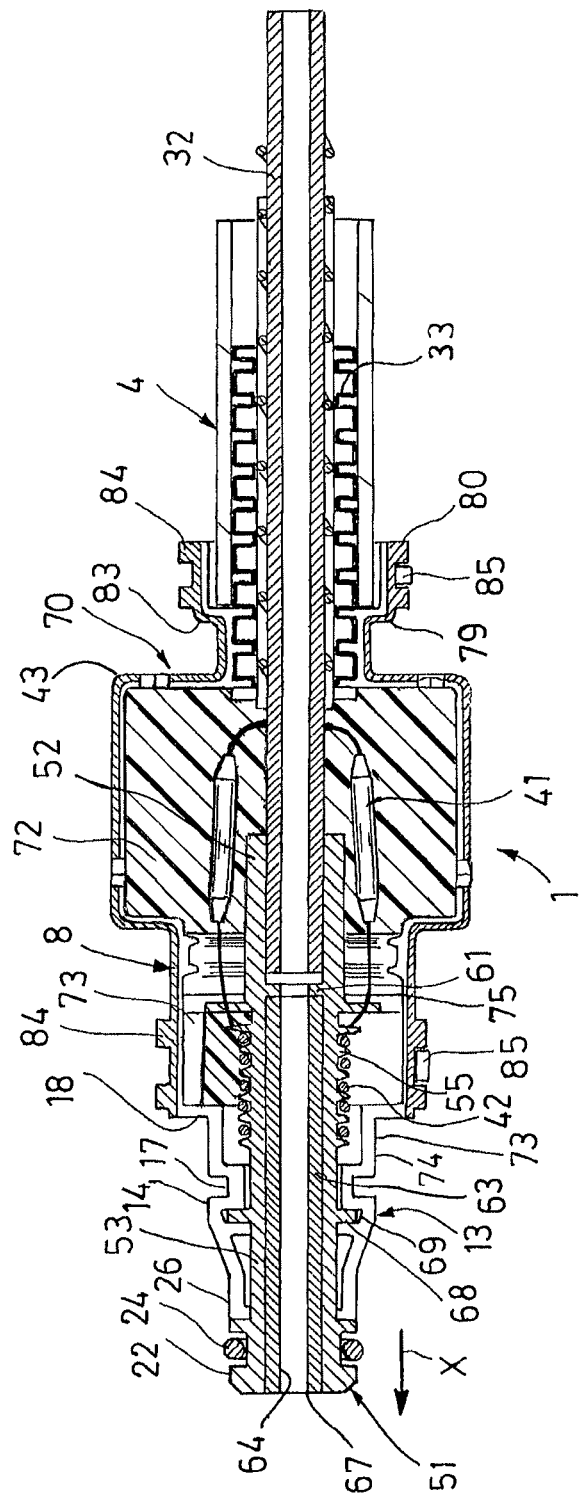
FIG. 5 shows a longitudinal section through a further embodiment of a preassembled line according to the invention.

FIG. 5 shows a further variant embodiment of a preassembled line according to the invention, parts which are identical to those in FIGS. 1 to 4 being provided with the same references.

Figure 6:
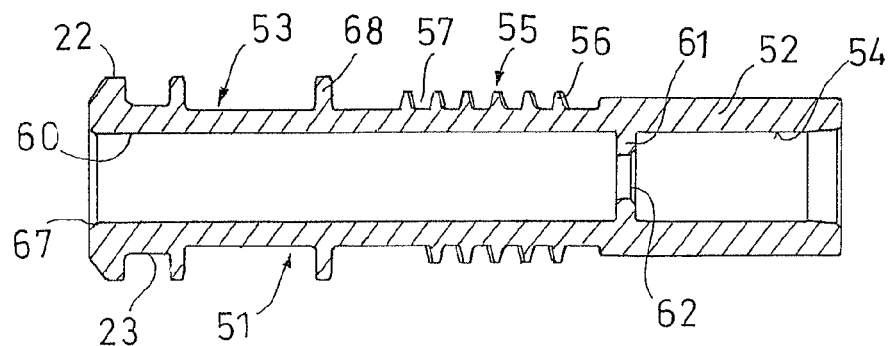
FIG. 6 shows a longitudinal section through a connector body in accordance with FIG. 5.
Figures 7, 7A:
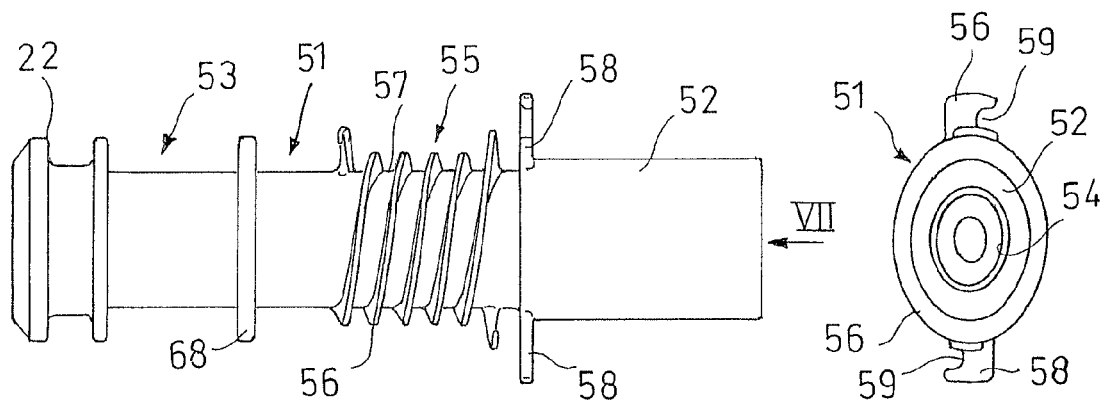
FIG. 7 shows an elevation of the connector body in FIG. 6.
FIG. 7a shows an elevation in accordance with arrow VII in FIG. 7, FIGS. 8a to 8d show different embodiments of heat-conducting elements according to the invention.
Figure 8A:
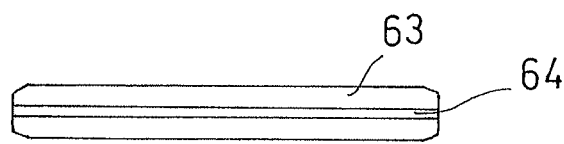
Figure 8B:
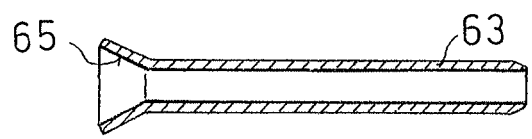
Figure 8C:
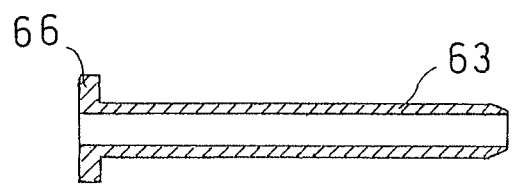
Figure 8D:
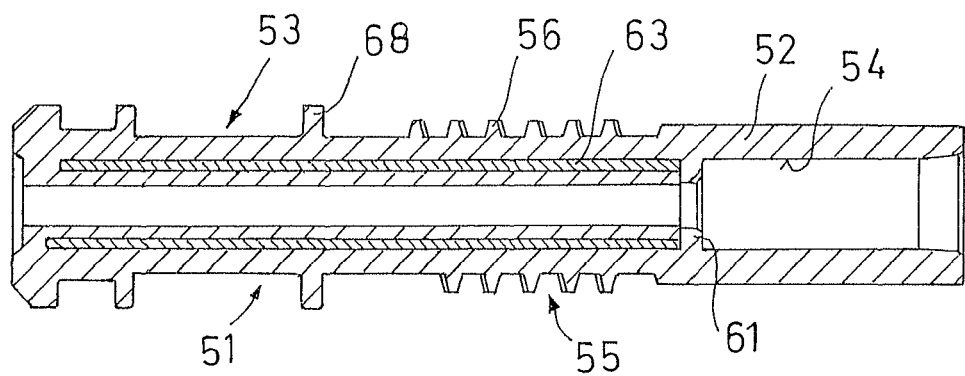

In this embodiment, the line connector 1 has a connecting body 51 made of plastics material, e.g. polyamide with glass fiber reinforcement, with a connecting portion 52 for the media line 4 and with a coupling portion 53 for sealed connection to a mating coupling part, see also FIGS. 6 and 7. The connecting portion 52 is designed as a hollow-cylindrical sleeve with an inner bore 54. The inner line tube 32 of the media line 4 is introduced into this inner bore 54 and fixed. The line tube 32 is preferably composed of plastic, allowing the line tube 32 to be connected to the connecting portion 52 by means of a laser weld. Adjoining the connecting portion 52 is a winding portion 55, on which the heating winding 42 is wound. For this purpose, the winding portion 55 has a rib 56 which extends helically around its circumference. Between the helically extending rib 56, a clearance region 57, which likewise extends helically and which serves to accommodate the winding wire of the heating winding 42, is produced between the rib turns. Formed integrally between the winding portion 55 and the connecting portion 52, at the start of the rib 56, there are two diametrically opposite retaining arms 58 which extend radially from the winding portion 55, see FIG. 7a. These retaining arms 58 serve to fix the wire of the heating winding 52 and prevent the heating wire from unwinding spontaneously in a partially assembled condition. For the introduction of the wire of the heating winding 42, the retaining arms 58 have an open-edged eye 59, resulting in a hook shape. The winding portion 55 is situated between the connecting portion 52 and the coupling portion 53 and, in relation to the housing 70, the winding portion 55 is in front of the housing portion 14 having the latching means 13, as seen in the direction of insertion X, this being a difference with respect to the embodiment in FIGS. 1 to 4. This results in a lengthening of the coupling portion 53 relative to the coupling portion 6 in FIGS. 1 to 4. Within the coupling portion 53 and the winding portion 55 there is a bore 60, which expediently has the same inside diameter as the inner bore 54. In the illustrative embodiment shown, there is an encircling, radially inward-projecting annular collar 61 between the inner bore 54 and the bore 60, said annular collar having a stop function. The annular collar 61 surrounds an aperture 62. It is expedient if the radial height of the annular collar 61 corresponds to the wall thickness of the line tube 52, see FIG. 5. This means that the throughflow cross section of the aperture 62 is equal to the throughflow cross section of the line tube 32. As can likewise be seen from FIG. 5, a heat-conducting element 63 composed of a material of good thermal conductivity, in particular metal, e.g. copper, aluminum or, if appropriate, stainless steel, is arranged within the region of extension of the winding portion 55 and of the coupling portion 53, in the bore 60 thereof. In the illustrative embodiment shown, this heat-conducting element 63 is shaped as a hollow-cylindrical sleeve and, in the interior, has a through opening 64 with an opening cross section corresponding to that of the aperture 62. This cross-sectional dimensioning results in a constant throughflow cross section from the line tube 32 to the end of the coupling portion 53. The tubular heat-conducting element 63 thus has, in particular, the same wall thickness as the line tube 32. The sleeve-shaped heat-conducting element 63 is expediently pushed into the bore 60, the annular collar 61 acting as a depth stop. The sleeve-shaped heat-conducting element 63 fits in the bore 60, preferably non positively, by being pressed into the bore 60. It is also possible for the sleeve-shaped heat-conducting element 63 to be fixed within the bore 60 positively and/or nonpositively by means of latching or retaining elements. As is illustrated, for example, in FIG. 8d, it is also possible for the heat-conducting element 63 to be embedded by injection molding within the connector body 51, which is composed of plastic. If the heat-conducting element 63 is composed of plastic, more particularly of a plastic with good thermal conductivity, it is possible to produce the connector body 51 and the heat-conducting element 63 as a one-piece part by the two-component method. Instead of a closed sleeve embodiment, the heat-conducting element 63 can also have a longitudinal slot 64, see FIG. 8a, and is thus similar in design to a spring dowel sleeve. As shown in FIG. 8b, the sleeve-shaped heat-conducting element 63 can also have a funnel-shaped widening 65 serving as a stop at one end, and can be seated in a centered manner in a matching widening of the bore 60 in the region of its forward opening 67. FIG. 8c shows a variant with an annular stop collar 66, which is accommodated in a matching recess in the bore 60 in the region of its forward opening 67. The design of the widening 65 and of the stop collar 66 makes it possible to dispense with an inner stop within the connector body 53, and the heat-conducting element 63 used then serves at the end as an inner stop for the line tube 32 to be introduced.

The heat-conducting element 63 can likewise be composed of one or more heat-conducting blanks, e.g. strip-shaped blanks. As an alternative, it is likewise within the scope of the invention if the sleeve-shaped heat-conducting element 63 has a connection-spigot contour at the end for the mounting of the line tube 32. If there is direct contact between the heat-conducting element 63 and the fluid flowing within the line tube 32, it is expedient to produce the heat-conducting element 63 from a corrosion-resistant metal or to provide it with a corrosion-resistant coating. It is also possible for the heat-conducting element 63 to undergo surface treatment to improve thermal conductivity and/or reduce roughness. Reducing roughness avoids to a large extent the deposition of urea crystals on the wall of the heat-conducting element when passing through a urea solution, for example.

In the region between the winding portion 55 and its forward sealing portion 22, the connector body 51 furthermore has a radially outward-projecting annular collar 68. This annular collar 68 is seated in a matching annular recess 69 in the housing 70 at a point behind the latching means 13 as seen in the direction of insertion X, the connector body 51 thereby being additionally fixed in the housing in the axial and radial directions.

Figure 9:
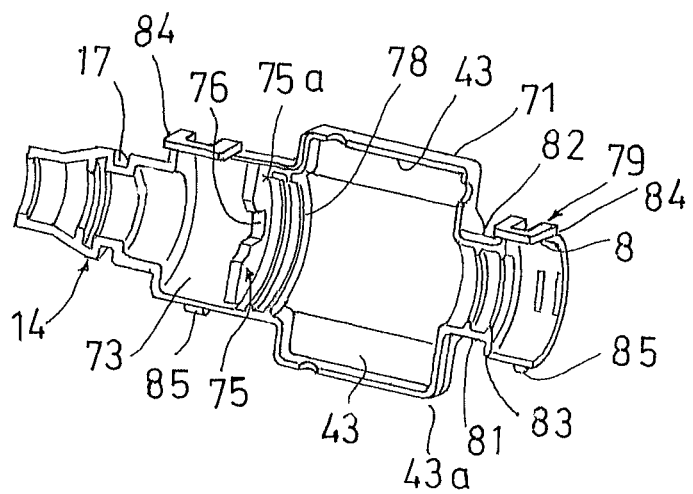
FIGS. 9 and 10 show side views of a housing half-shell according to the invention.
Figure 10:
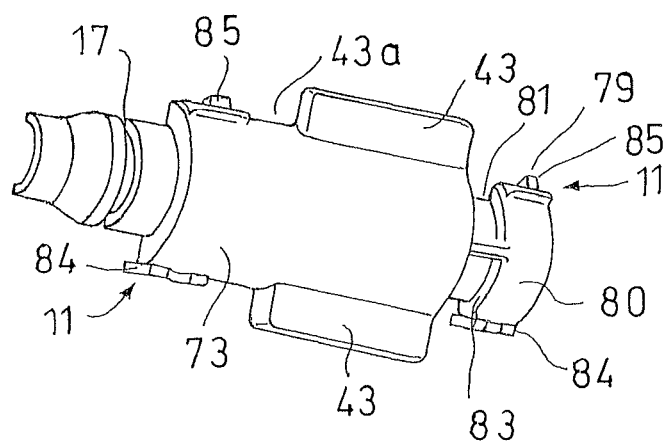
Figure 11:
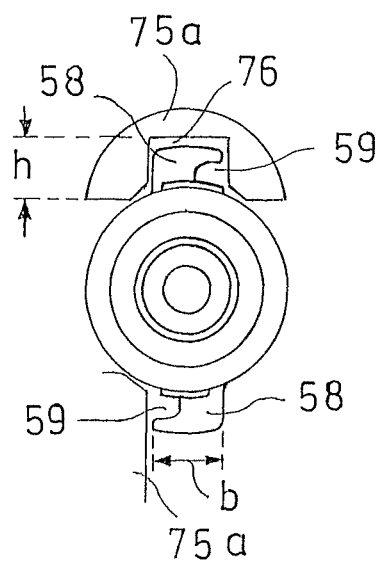
FIG. 11 shows an elevation of two partial views for the purpose of illustrating the different positions of the retaining arms according to the invention.

As illustrated in FIG. 5, the connector body 51 and the media line 4 are surrounded in their end connecting region by the housing 70, which, as shown in FIGS. 1 to 4, is likewise composed of two housing half-shells 71 that can be connected to one another. These half-shells 71 forming the housing 70 engage positively around the connector body 51 and the connection end of the media line 4. In the illustrative embodiment shown in FIG. 5, there is a division of the sealing and latching function, as described with reference to FIGS. 1 to 4, between the connector body 51 and the housing 70. As also described with reference to FIGS. 3 and 4, the housing 70 has diametrically opposite protrusions 43, see FIGS. 9 and 10. These protrusions 43 serve to accommodate the crimped connection 41 between the heating wire 7 and the heating winding 42. These protrusions 43 can be filled with a potting compound 72, which is introduced via lateral openings in the protrusions 43. In the region between the outer stop 18, which is formed by a radially outward-facing housing wall, and the protrusions 43, the housing 70 has a widened portion 73, the inside diameter of which is greater than the inside diameter of a housing portion 74 which adjoins the widened housing portion 73 in a direction toward the latching groove 17 and which is less than the inside diameter in the region of the protrusions 43. The housing portion 74 has an inside diameter which is greater than the outside diameter of the winding portion 55 in the region of the rib 56, with the result that the winding portion 55 projects with a radial clearance into this housing portion 74. It can furthermore be seen, in particular from FIG. 9, that an intermediate wall 75 is formed in the widened housing portion 73, more particularly one wall portion 75a being formed in each housing half-shell 71. The height of each wall portion 75a is less than the width b of the retaining arms 58, see FIG. 11. Moreover, each wall portion 75a has a partial window opening 76, the height h of which, see FIG. 11, is such that the retaining arms 58 can be accommodated. The intermediate wall 75 is arranged in the widened housing portion 73 in such a way that, in the assembled condition, with the retaining arms 58 in a position at 90° to the parting plane of the housing 70, the retaining arms 58 are accommodated in the partial window openings 76, see the top half of FIG. 11, and, with the retaining arms 58 in a position in the parting plane of the housing 70, the retaining arms 58 lie between the wall portions 75a, see the bottom half of FIG. 11. In both positions, the openings of the eyes 59 of the retaining arms 58 are closed by virtue of this arrangement. In the region between the intermediate wall 75 and the protrusions 43, encircling reinforcing ribs 78 are formed in the interior of the widened housing portion 73. The widened housing portion 73 can likewise be filled completely or partially with a potting compound. On the opposite side of the protrusions 43 from the widened housing portion 73, the housing 70 has an introduction stub 79 for the media line 4. This introduction stub 79 has an introduction portion 80, the inside diameter of which corresponds to the outside diameter of the media line 4, and a necked centering portion 81 for the line tube 32, said centering portion ending at the protrusions 43. The centering portion 81 has encircling interior ribs 82 which have an inside diameter that is matched to the outside diameter of the line tube 32. In this arrangement, a transition wall 83 between the introduction portion 80 and the centering portion 81 serves as a stop for the outer protective tube 33 of the media line 4, for example, said protective tube being designed as a corrugated tube. The half-shells 71 forming the housing 70 are held together by latching means 11, which can be composed of latching tabs 84 and latching projections 85, which are formed integrally on the outside of the introduction portion 80 and of the widened housing portion 73. The construction of the housing half-shells 71 in accordance with the invention makes it possible to produce them with a single mold.

It is likewise within the scope of the invention to use a connector body 90 that likewise assumes the latching function of the plug connection, eliminating the need to provide the housing itself with corresponding latching means. An embodiment of this kind is shown in FIGS. 12 and 13. Here, parts and features that are identical to those in the embodiments in FIGS. 1 to 6 are provided with the same references. The embodiment shown is suitable for known SAE connections. The connecting portion 52 and the winding portion 55 correspond to the embodiment shown in FIGS. 5 and 6. Adjoining the winding portion 55, as seen in the direction of insertion X, are two spaced annular projections 91, which enclose between them a retaining groove 92 that serves as a housing receptacle and as a fixing for a housing (not shown). Adjoining this is the coupling portion 53. This is composed of a fixing portion 93, which adjoins the annular projections and is terminated by an annular retaining collar 94. The fixing portion 93 serves to receive retaining means mounted in the plug reception part (not shown). Adjoining the retaining collar 94 is the introduction and sealing portion 95, against which sealing means present in the plug reception part rest in a sealing manner in the inserted condition of the plug and sealing portion 95. In order to conduct heat generated in the winding portion 55 into the introduction and sealing portion 95, a heat-conducting element 63 is arranged in the connector body 90, in which connection attention is drawn to the description of FIGS. 4, 8a, 8b, 8c, 8d.

It is likewise possible, in accordance with the invention, to replace the plug-in spigot 31 with the connecting portion 52 in the embodiment shown in FIG. 1, and to replace the connecting portion 52 by the plug-in spigot 31 in the embodiments shown in FIGS. 4 and 12. It is also possible for a heat-conducting element 63 to be provided in the embodiment shown in FIG. 1.

The present invention likewise includes a line connector 1 having the features described in conjunction with the preassembled line shown in FIGS. 1 to 13, and likewise includes the housing 8, 70 and the connector body 2, 51, 90 as individual components. The individual components 1, 8, 70 and 2, 51 according to the invention can also be used for the connection of unheated media lines 4.

The invention is not restricted to the illustrative embodiment shown but also includes further embodiments equivalent to the features described. Thus, for example, it is likewise possible for the housing 8 to be molded as an injection molding around the connector body 2 connected to the media line 4.

The invention can also be defined by any other desired combination of particular features from among all the individual features disclosed overall.

The invention claimed is:

1. A preassembled line for axial engagement in a direction of insertion (X) with a mating coupling part, the preassembled line comprising a line connector having a connector body with a connecting portion to which a media line is connected, the connector body also having a coupling portion with a circumferentially extending sealing member thereon for sealing relative to the mating coupling part, the media line being provided with a heating wire also arranged at least partially on the coupling portion, the connector body and the media line and the heating wire being surrounded at one end by a housing, the housing having a latching means on an outer circumference for latching connection with the mating coupling part, the latching means being formed on the housing in an area where the housing surrounds the coupling portion, whereby sealing of the preassembled media line to the mating coupling part is separated from connecting of the preassembled media line to the mating coupling part and separately performed by the connector body and the housing, wherein the latching means is composed of a latching cam formed on the circumference of the housing, and behind which, in an opposite direction to the direction of insertion (X), a latching groove is formed.

2. The preassembled line of claim 1, wherein a circumferential gap portion for accommodating the media line is formed between the housing and the connector body in the region of the connecting portion, and a circumferential gap region is formed in the region of the coupling portion having the latching means.

3. The preassembled media line of claim 1, wherein said housing is formed from housing shells.

4. The preassembled line of claim 1, wherein the media line is composed of an inner line tube, on the circumference of which the heating wire is arranged, and of an outer protective tube.

5. The preassembled media line of claim 4, wherein the heating wire is wound in a spiral.

6. The preassembled media line of claim 4, wherein said outer protective tube is a corrugated tube, the heating wire being fixed on the line tube by means of an adhesive tape surrounding said wire or being embedded in a layer of plastic, and the housing having on its inner wall, in the region of the circumferential gap portion, circumferential ribs which engage in corrugation troughs of the corrugated tube.

7. The preassembled line of claim 1, wherein the connector body is dimensioned such that a plug-in and sealing portion of the coupling portion, which includes the sealing member, projects from the housing and engages the mating coupling part.

8. The preassembled line of claim 7, wherein the plug-in and sealing portion of the coupling portion and an introduction portion of the housing have the same outside diameter, the introduction portion adjoining the plug-in and sealing portion and being of circular-cylindrical cross section, the latching means of the housing being formed on a rearward end of the introduction portion as seen in an opposite direction to the direction of insertion (X).

9. The preassembled line of claim 7, wherein the plug-in and sealing portion has in its outer surface a circumferential groove with a circumferential seal arranged therein.

10. The preassembled line of claim 7, wherein following on from the plug-in and sealing portion as seen in the direction opposite from the direction of insertion (X), the connector body includes a body portion of reduced diameter relative to the diameter of the plug-in and sealing portion, there being an annular collar on the circumferential surface of the body portion and defining a groove between the collar and the plug-in and sealing portion, the groove receiving therein a retaining extension formed integrally on an inside of the housing at one end thereof.

11. The preassembled line of claim 10, wherein an encircling stop for the media line is formed integrally on the connector body between the body portion of reduced diameter and a plug-in spigot formed on the connector body, a gap for passing through the heating wire being formed between the outer circumference of the stop and an opposite inner wall of the housing, and the stop having a polygonal circumferential contour as an anti-rotation safeguard.

12. A preassembled line for axial engagement in a direction of insertion (X) with a mating coupling part, comprising a line connector having of a connector body with a connecting portion to which a media line is connected, the connector body also having a coupling portion with a sealing member configured to seal relative to the mating coupling part, the media line being provided with a heating wire also arranged at least partially on the coupling portion, the connector body and the media line and the heating wire being surrounded at one end by a housing, the housing having a latching means for latching connection with the mating coupling part, the latching means being formed on the housing portion in an area where the housing portion surrounds the coupling portion, whereby sealing of the preassembled media line to the mating coupling part is separated from connecting of the preassembled media line to the mating coupling part and separately performed by the connector body and the housing, the connector body being composed of plastic material, the connecting portion being a hollow-cylindrical sleeve with an inner bore, the connecting portion being adjoined by a winding portion on which a heating winding is wound, the winding portion including a rib that extends helically around a circumference of the winding portion and a clearance region that accommodates a winding wire of the heating winding, the clearance region being formed between successive turns of the rib.

13. The preassembled line of claim 12, wherein the connector body includes an encircling, radially inward-projecting annular collar situated between the inner bore and the bore, and the inward-projecting annular collar defining an aperture having a cross section equal to a throughflow cross section of the media line, the inward-projecting annular collar forming a stop limiting insertion of the media line into the connector body.

14. The preassembled line of claim 12, wherein a bore is provided within the region of the winding portion and of the coupling portion, and a heat-conducting element composed of a thermally conductive material is provided within the bore.

15. The preassembled media line of claim 14, wherein said heat-conducting element is composed of metal.

16. The preassembled line of claim 12, wherein the latching means includes a latching groove, the housing when viewed in a direction opposite of the direction of insertion (X) has after the latching groove an outer stop and diametrically opposed protrusions, the housing having in a region between the outer stop and the protrusions a widened housing portion, an inside diameter of the widened housing portion being greater than an inside diameter of the housing portion immediately after the latching groove as seen in a direction opposite of the direction of insertion (X), and has an inside diameter which is less than an inside diameter defined by the protrusions, and the winding portion being located substantially in this widened housing portion.

17. The preassembled line of claim 16, wherein the widened housing portion has arranged in it an intermediate wall which is composed of wall portions present in each housing half-shell, and the height of each wall portion is less than the width of the retaining arms, and each wall portion has a partial window opening, the height of which is such that the retaining arms can be accommodated, the intermediate wall being arranged in the widened housing portion such that, in the assembled condition, with the retaining arms in a position at 90° to the parting plane of the housing, the retaining arms are accommodated in the partial window openings, and, with the retaining arms in a position in the parting plane of the housing, the retaining arms lie between the wall portions.

* * * * *